United States Patent
Smith-Mickelson et al.

(10) Patent No.: US 8,255,532 B2
(45) Date of Patent: Aug. 28, 2012

(54) METRIC-BASED MONITORING AND CONTROL OF A LIMITED RESOURCE

(75) Inventors: Jared Smith-Mickelson, Pacifica, CA (US); Maxim Zhilyaev, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 525 days.

(21) Appl. No.: 11/226,927

(22) Filed: Sep. 13, 2005

(65) Prior Publication Data

US 2006/0059568 A1 Mar. 16, 2006

Related U.S. Application Data

(60) Provisional application No. 60/609,730, filed on Sep. 13, 2004.

(51) Int. Cl.
*G06F 15/173* (2006.01)
(52) U.S. Cl. ........ 709/225; 709/226; 709/224; 702/182; 702/185; 714/47
(58) Field of Classification Search ........... 709/223–226
See application file for complete search history.

(56) References Cited

U.S. PATENT DOCUMENTS

| | | | | |
|---|---|---|---|---|
| 5,160,901 A | * | 11/1992 | Stone | 331/37 |
| 5,708,422 A | * | 1/1998 | Blonder et al. | 340/5.41 |
| 6,223,985 B1 | * | 5/2001 | DeLude | 235/382 |
| 6,334,124 B1 | | 12/2001 | Bouchard et al. | |
| 6,643,613 B2 | * | 11/2003 | McGee et al. | 702/186 |
| 6,728,955 B1 | * | 4/2004 | Berry et al. | 717/158 |
| 6,832,239 B1 | | 12/2004 | Kraft et al. | |
| 6,961,562 B2 | * | 11/2005 | Ross | 455/425 |
| 6,993,686 B1 | * | 1/2006 | Groenendaal et al. | 714/47 |
| 7,058,708 B2 | * | 6/2006 | Gold et al. | 709/224 |
| 7,360,102 B2 | * | 4/2008 | Inoue | 713/300 |
| 7,397,765 B2 | * | 7/2008 | Aimoto et al. | 370/252 |
| 2005/0038888 A1 | * | 2/2005 | Labertz | 709/224 |
| 2006/0153174 A1 | * | 7/2006 | Towns-von Stauber et al. | 370/356 |

OTHER PUBLICATIONS

Mao et al,"Route Flap Damping Exacerbates Internet Routing Convergence", 2002, SIGCOMM'02, Aug. 19-23, 2002, all pages, http://www.eecs.umich.edu/~zmao/Papers/sig02.pdf.*
Bush et al., "Route Flap Damping: harmful?", Oct. 28, 2002, NANOG/Eugene, all pages,http://archive.psg.com/021028.zmao-nanog.pdf.*
Customer HTML Authentication, Jan. 9, 2003, "Best Practices on Securing Custom HTML Authentication Procedures," Technical Info making sense of security, all pages, http://www.technicalinfo.net/papers/CustomHTMLAUthentication.html.*

* cited by examiner

*Primary Examiner* — Michael Y Won
*Assistant Examiner* — Hua Fan
(74) *Attorney, Agent, or Firm* — Baker Botts L.L.P.

(57) ABSTRACT

Detecting unauthorized or excessive use of a resource is disclosed. The value of a metric is updated based at least in part on a first data associated with a current event associated with the metric and a second data associated with a most recent prior event associated with the metric. Responsive action is taken if the updated value of the metric exceeds a threshold.

17 Claims, 3 Drawing Sheets

METRIC-BASED MONITORING AND CONTROL OF A LIMITED RESOURCE

CROSS REFERENCE TO OTHER APPLICATIONS

This application claims priority to U.S. Provisional Patent Application No. 60/609,730 entitled DETECTION OF DENIAL OF SERVICE ATTACKS filed Sep. 13, 2004 which is incorporated herein by reference for all purposes.

FIELD OF THE INVENTION

The present invention relates generally to monitoring and controlling access to a limited resource. More specifically, a metric-based approach to monitoring and controlling access to a limited resource is disclosed.

BACKGROUND OF THE INVENTION

It is useful to be able to monitor and/or control access to a limited resource, especially in contexts in which placing more demands on the resource than the resource can meet may result in the resource becoming unavailable to operate even at the limited level it can support. One example of a limited resource is a network resource, such as a server or other system accessed via a network. Network-connected systems have a limited ability to process and exchange (e.g., send, receive) data. Errors or other failures can occur when the processing and/or communication capacity of such a system is exceeded, either as the result of high legitimate demand or malicious attack (e.g., so-called "denial of service" attacks). It is desirable to have an efficient way to detect when such an error or failure condition may occur and, if desired, to limit access or usage to a level that will enable such errors and/or failures to be avoided.

Even in contexts in which there is no particular risk that the processing and/or communication capacity of a system will be exceeded, it may be desirable to limit access by a particular user, process, or system, e.g. to implement a quality of service or other guarantee made with respect to that or some other user, process, or system. In other contexts, it would be useful to have an efficient way to detect use patterns that deviate from historic use and/or use patterns otherwise determined to be associated with normal or authorized use, such as detecting an unusual pattern of use of a credit card or other financial account, which may indicate the credit card and/or account information has been stolen.

One prior art approach to detecting and/or preventing a condition that might result in an error or failure, or that might result in a quality of service guarantee or some other relevant threshold or level of use being exceeded, e.g., has been to define a "sliding window" and track the demand made on the system (e.g., the number or cumulative size of the messages or other communications received) during a period defined by the window. For example, under one typical approach one might track how many messages were received in the last X seconds. In some cases, an alert may be sent or other responsive action taken if more than N messages were received in a period of X seconds. Or, in the case of a credit card or other account, a similar approach might be used to track how many transactions were charged to the account in a given hour, week, day, etc., with an alert being generated if the use exceeds a prescribed threshold. However, such an approach consumes a lot of processing and memory resources, as it is necessary to keep track of lots of data, such as which messages have been received (or transactions completed in the credit card example) and at what time, and continually (or at least periodically) perform computations on such information to determine the number of messages received within the sliding analysis window.

Therefore, there is a need for an efficient way to detect when demand, either collectively or from a particular source, exceeds the bandwidth or capacity available or allotted to satisfy the demand, such as from a network-connected system, and to detect patterns that may indicate unauthorized use.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A metric-based approach to detecting when conditions are such that demand, such as for a network-accessible resource, may exceed the bandwidth available and/or allotted to satisfy the demand, or when actual use of a resource deviates from an expected, normal, and/or permitted level of use, is disclosed. A metric is incremented each time use event occurs, e.g., each time a message is received by a network based resource such as a firewall, gateway, server, etc., and decayed over time. A responsive action is taken if the metric exceeds a threshold. In some embodiments, if the metric exceeds the threshold value subsequent attempts to use the resource, e.g., network communications from a particular offending source, may be blocked for a period.

Figure 1A:
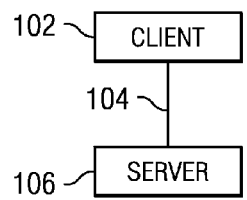
FIG. 1A illustrates a client-server environment.

FIG. 1A illustrates a client-server environment. A client 102 has a connection 104 to a server 106. The client 102 may be a computer or other system configured to communicate with server 106 via connection 104, e.g., to request data from server 106. Server 106 may be a computer or other system or process configured to receive data from and/or provide data to a client such as client 102 via connection 104. While a single client 102 and server 106 are shown, a typical commercial application may involve many clients and/or more than one server. The connection 104 may be a direct connection, but more typically it is a network connection over a private network (e.g., a LAN or WAN) and/or a public network, such as the Internet. As described more fully below, in one embodiment the server 106 is configured to regulate messages, either globally or based on source, class, size, destination, user, account, data included in the message, or other criteria, using the metric-based approach described herein.

Figure 1B:
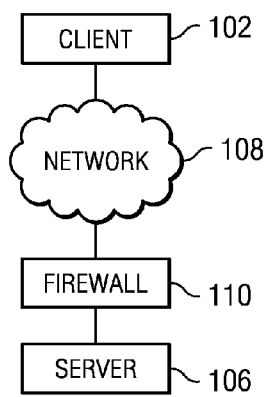
FIG. 1B illustrates a client-server environment that includes a firewall.

FIG. 1B illustrates a client-server environment that includes a firewall. The client 102 is connected via a network 108 to a firewall 110. Firewall 110 is configured to receive messages sent by client 102 to server 106 via network 108 and forward such messages to server 106 if forwarding criteria are satisfied. In one embodiment, the firewall 110 is configured to apply the metric-based approach described herein to prevent the client 102, or clients generally, from exceeding the bandwidth on server 106 that is available and/or has been allotted to it/them. If a message would exceed an associated limit, e.g., a threshold value for the metric would be exceeded, or in some embodiments if a prior message caused the threshold to be exceeded resulting in a blocking period being imposed, the firewall 110 blocks subsequent messages associated with the metric that has exceeded its associated threshold, e.g., messages from the affected source(s) and/or of the affected type.

Figure 1C:
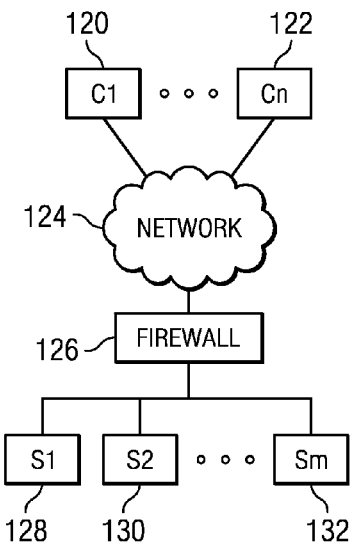
FIG. 1C illustrates yet another illustrative client-server environment.

FIG. 1C illustrates yet another illustrative client-server environment. In this example, a plurality of clients C1 to Cn, represented in FIG. 1C by clients 120 and 122, are connected via network 124 to firewall 126. Clients C1 to Cn send messages to one or more of a plurality of backend servers S1 to Sm associated with firewall 126, represented in FIG. 1C by servers 128, 130, and 132. As in the example shown in FIG. 1B, the metric-based approach described herein is implemented in one embodiment on firewall 126, e.g., to detect and/or prevent the demand (e.g., messages) made on one or more of the servers S1 to Sm from exceeding an applicable limit, such as to detect and/or avoid a condition that may be associated with and/or similar in its consequences to a denial of service type attack. In some embodiments, each of servers S1 to Sm has associated with it a corresponding metric and threshold, not necessarily the same as the corresponding metric and threshold for one or more other of the servers S1 to Sm, and firewall 126 uses the metric for each server to throttle, i.e., control the rate of, data transmission to that server so as to not exceed a communication and/or processing bandwidth and/or other capacity constraint of the server. For example, an enterprise may have two or more servers configured to perform a particular service, e.g., to host a particular application, but due to differences in hardware, configuration, etc. one server may have a higher capacity than the other(s). In some embodiments, the firewall tracks incoming connections/transmissions on a per client basis on the client side of firewall 126 (connected to network 124) and uses a per-server metric (for all clients, classes, etc.) on the server side (connected to servers 128-132) to throttle traffic to the servers. So long as the metric associated with a client has not been exceeded, it is able to connect to those of servers 128-132 that have not had traffic to them blocked as a result of their respective metrics exceeding their associated thresholds. In some embodiments, if the metric for a particular one or more of servers 128-132 has been exceeded, the firewall 126 blocks traffic to the affected server(s) for a time, and directs/redirects connections that otherwise would have been made to the affected server(s) to one or more other, unaffected servers for which the associated metric has not exceeded its applicable threshold. In some embodiments, the firewall uses a round robin approach to direct connection requests to servers S1 to Sm and skips any server for which the new connection would result in the server's metric exceeding its threshold.

The examples shown in FIG. 1A-1C are for purposes of illustration only and do not limit the generality of the approach described herein, nor the scope of the appended claims. In particular, while FIGS. 1A-1C show client-server environments, the approach described herein may be applied as well to other environments. In one embodiment, the firewalls shown in FIGS. 1B and 1C may comprise an XML firewall configured to validate and/or otherwise process requests or messages comprising XML documents, such as SOAP or other messages being sent to a backend server for processing in a web services context.

In some embodiments, the firewall may monitor use of a financial or other account, or other data usable to detect a use pattern that deviates from an expected, normal, and/or permitted level of use, such as may indicate unauthorized use such as may occur in the case of theft (including identity theft) or fraud. In some embodiments, data transmissions associated with account use, such as charge authorizations, debit transactions, etc., are monitored by maintaining a metric on a per user and/or per account basis. For each authorization/transaction, user and/or account identifier data, as applicable, is determined and an associated metric is updated. If the metric exceeds an associated threshold, e.g., as a result of an unusual number of transactions in a short period and/or transactions involving unusually large amounts, a responsive action (block further use, alert, etc.) is taken.

In various embodiments, the value of the metric is incremented on occurrence of each event by a weighted amount determined based on data associated with the event, e.g., by the size of a received data message in bytes, the dollar amount of a transaction, etc. Single events that consume a large amount of a limited resource are weighted more heavily in this approach than events that consume relatively fewer resources.

Figure 2A:
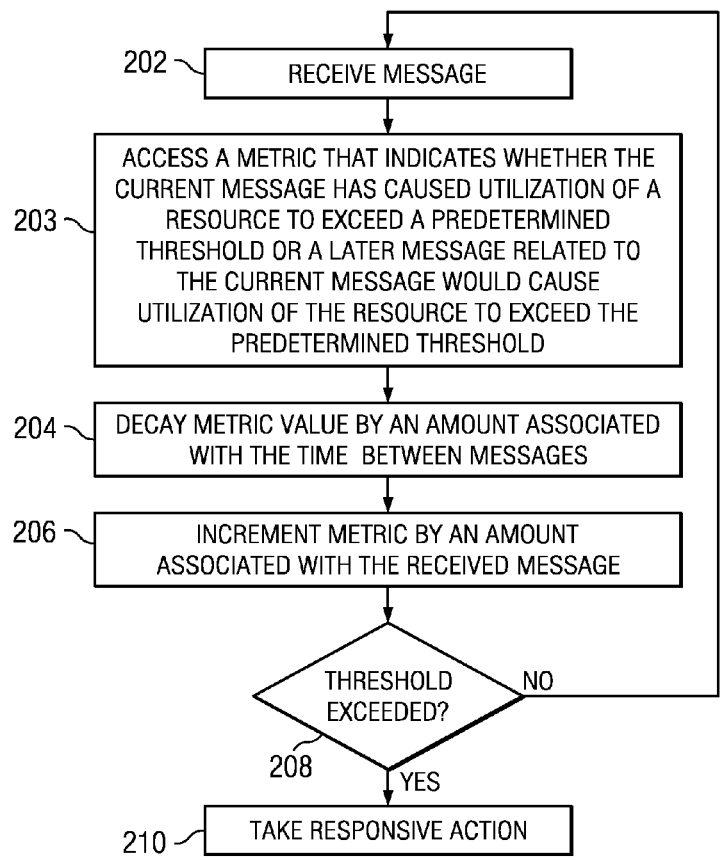
FIG. 2A illustrates a process used in one embodiment to implement a metric-based approach to detecting and/or preventing demand for a resource, such as a server, from exceeding a prescribed or otherwise applicable limit.

FIG. 2A illustrates a process used in one embodiment to implement a metric-based approach to detecting and/or preventing demand for a resource, such as a server, from exceeding a prescribed or otherwise applicable limit. A message is received (202). In some embodiments, an event other than receiving a message, such as receiving an indication that a credit card has been used, occurs at 202. An associated metric is then accessed (203). The metric, as described above, indicates whether the current message or other current event has caused utilization of a resource to exceed a predetermined threshold or a later message related to the current message would cause utilization of the resource to exceed the predetermined threshold. In the current example, the value of a metric used to monitor and/or limit messages, e.g., to detect or prevent a denial of service attack or similar condition, is decayed (i.e., decremented) by an amount associated with the amount of time that elapsed between the message currently being processed and the next most recently received message (204). In various embodiments, the metric is decayed by an amount determined at least in part on data other than the amount of time that elapsed between the message currently being processed and the next most recently received message, such as the time of day, the size of the message, the nature/type of message, use conditions generally (i.e., across users), etc. In one embodiment, a separate metric is maintained for separate classes or types of message and in such embodiments each respective metric is decayed in 204 by an amount associated with the amount of time that has elapsed between the message currently being processed and the next most recently received message of the class/type with which the particular metric being decayed is associated. By way of example, in one embodiment an instance of the metric is used to limit the number of unauthorized messages to three messages per minute. When an unauthorized message is received the time considered in calculating the amount of decay is the time that has elapsed since receipt of the unauthorized message that is currently being processed and the last unauthorized message, although one or more (even many) authorized messages may have been received in the time in between. In one embodiment, the value of the metric is decayed in 204 by multiplying the value of the metric by a base "b" raised to an exponent equal to the time "dt" that elapsed between the current and next most recently received messages associated with the metric, such that the decay is exponential over time. In some embodiments, the decay is linear, e.g., the metric is decayed by subtracting from the current value of the metric the product of a base "b" and the elapsed time "dt". In some embodiments, a hybrid approach is used, e.g., by decaying the value of the metric exponentially above the threshold and linearly below. The latter approach is used in some embodiments to avoid false detections in environments, such as test environments, in which periodic use patterns may occur. In some embodiments, exponential decay, at least for the region above the threshold, is used to enable a block (or alert, etc.) state to be cleared more quickly after a detection event caused by a single large (i.e., heavily weighted) event and/or a burst of smaller events causes the metric value to spike.

In 206, the value of the metric is incremented by an amount associated with the message currently being processed. In some embodiments, the value of each message is the same and in such embodiments the same amount (e.g., 1) is added to the metric in step 206 regardless of the nature or source of the message being processed. In other embodiments, a weighted value associated with some attribute of the message is added to the metric in step 206.

Equation (1) summarizes the result of performing steps 204 and 206 in the general case in which a weighted value "$w_k$" associated with the "k-th" received message, in an embodiment in which exponential decay is used.

$$m_k = m_{k-1} b^{dt} + w_k \quad (1)$$

where "$m_k$" is the value of the metric after receipt of the k-th message (i.e., the message currently being processed), "$m_{k-1}$" is the value of the metric at the time of receipt of the message received just prior to the k-th message, "b" is a based between 0 and 1, determined in some embodiments as described below, "dt" represents the time that elapsed between receipt of the message k and k-1 (i.e., $dt = t_k - t_{k-1}$), and "$w_k$" is the weight value of the k-th message.

While exponential decay is shown in Equation (1), as noted other approaches, such as linear decay, a combination of linear and exponential decay, or any other approach suitable to the circumstances and/or requirements of a particular embodiment may be used. While in Equation (1) the amount the metric is decayed is determined at least in part by the time elapsed between messages of the type (e.g., from the source, to the server, etc.) with which the metric is associated, in various embodiments other and/or different data is used to determine the amount the value of the metric is decayed, e.g., the time of day of the last previous message, the time of receipt of the current message, the day of the week (e.g., whether it is a weekday, weekend, holiday, etc.), a weight value associated with the last previous message, a weight value associated with the current message, the threshold value for the metric, the proximity of the metric to the threshold, the value of the metric relative to the threshold (e.g., greater or lesser), one or more constants (e.g., in addition to and/or instead of the base "b"), and message details such as the source, destination, size, and/or data included and/or associated with the message (e.g., a user identity, account number, etc.). The precise formula used to decay the value of the metric in any given implementation will depend on such factors as the nature and capacity of the resource being monitored and/or controlled, the requirements of and/or commitments made to respective users of the resource, and the characteristics of normal and anticipated permitted use of the resource.

Referring further to FIG. 2A, it is determined whether the value of the metric is greater than an associated threshold (208). In some embodiments, a threshold or maximum permissible value "M" of the metric is established and it is determined in step 208 that the threshold has been exceeded if the value of the metric "m" is greater than the threshold "M" (i.e., m>M). In some embodiments, the value of the threshold "M" for a given instance of a metric "m" may vary, depending on such factors as the time of day, day of the week, season, external conditions (e.g., environmental or weather conditions), status and availability of related resources (e.g., other servers able to process the message). For example, a credit card transaction (or a closely spaced burst of transactions) may be afforded greater weight at 4 a.m. than at 4 p.m., for a metric used to detect unauthorized use, e.g., on the theory that use at an unexpected level at a time when most users are asleep and most businesses closed is more suspicious than an increased use of similar proportions that occurs during the business day.

In some embodiments in which the value of the metric is decayed at least in part exponentially, the equivalent of exponential decay is implemented by incrementing the value of the metric logarithmically at 208 and then applying linear decay at 206. In some embodiments in which a combination of exponential (e.g., for values of "m" greater than "M") and linear (e.g., for values of "m" below "M") is desired, partially exponential decay is implemented by incrementing the value of m at 208 in full increments up to the level m=M and logarithmically above the threshold "M". For example, if the current value of m=8, the threshold M=10, and an event of weight w=4 occurred, in some embodiments the value of the metric m would be incremented to m=10+ln 2.

If no applicable threshold has been exceeded (208), the process returns to step 202 and the next message (or other event) is received and processed. If an applicable threshold has been exceeded, responsive action is taken (210). In some embodiments, the responsive action comprises generating an alert. In some embodiments, the responsive action comprises blocking messages from one or more sources associated with the metric and/or messages of one or more classes or types of message associated with the metric, if the threshold is exceeded. In some such embodiments, the blocking continues until the value of the metric has decayed to a level such that at least one message of a prescribed weight (or at least one message of an expected or typical type or size, in an embodiment in which weights are not assigned) could be received without the value of the metric exceeding the threshold. Further and/or different responsive actions may be taken in other embodiments. For example, in the case of a metric used to detect unauthorized use of personal data and/or property, such as a bank or credit card account, the responsive action may include notifying an owner and/or provider of the account (such as a bank), notifying public or private enforcement authorities, freezing or otherwise limiting further access to an account, and alerting other institutions, third party clearing houses, etc. so that they may inspect more carefully transactions associated with the same data, e.g., the same user as identified by name, SSN, and/or other identity information that may have been stolen. In an embodiment in which a metric is being used to throttle traffic to a backend server and/or other resource, 210 may include directing/redirecting requests to use the resource to other resources, e.g., other servers, able to process the request; and/or sending to a source of the request an indication that the resource is not currently available.

Figure 2B:
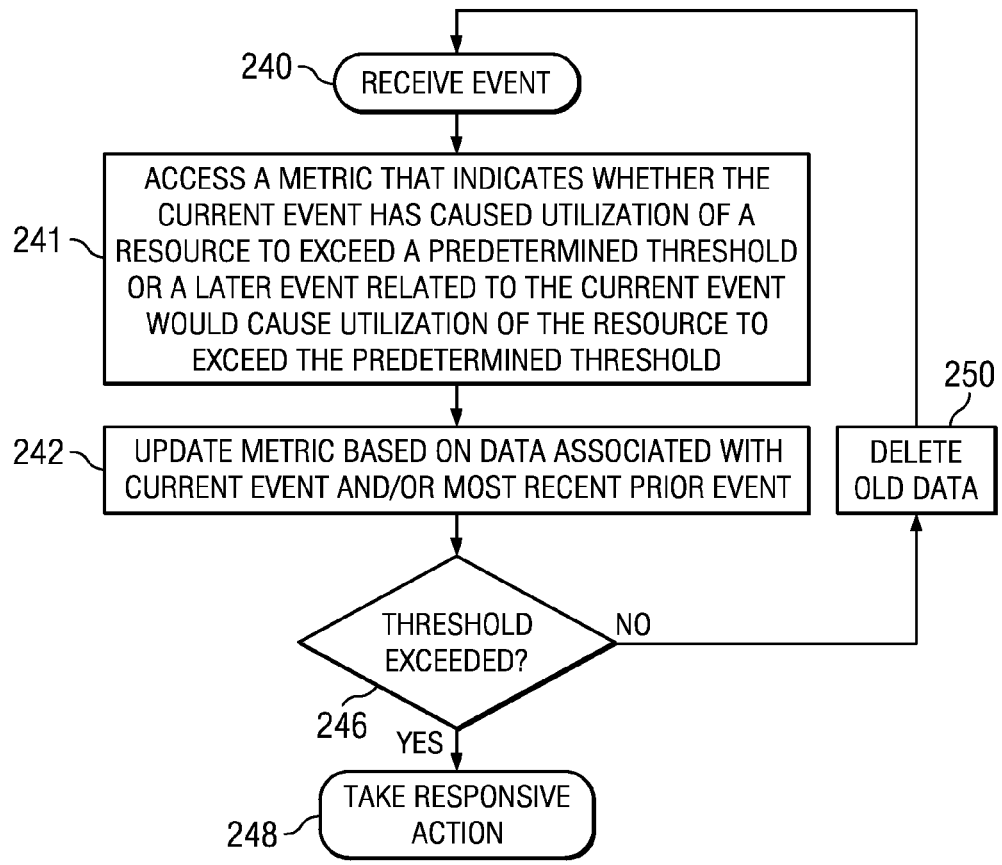
FIG. 2B illustrates a process used in some embodiments to implement a metric-based approach to monitoring and/or controlling access to a resource.

FIG. 2B illustrates a process used in some embodiments to implement a metric-based approach to monitoring and/or controlling access to a resource. An event is received (240). Examples of events include a data or other message; a debit or other transaction and/or charge authorization request; data requiring processing by a server or other resource; etc. An associated metric is then accessed (241). The metric, as described above, indicates whether the current event has caused utilization of a resource to exceed a predetermined threshold or a later event related to the current event would cause utilization of the resource to exceed the predetermined threshold. The metric is updated based on data associated with the event received at 240 and/or the most recent prior event associated with the metric (242). In some embodiments, data associated with events previous to the most recent prior event is not used at 242 to update the metric and as such data for such prior events is not required to be retained for purposes of monitoring and/or controlling access to the resource. If the updated metric exceeds a prescribed threshold (246), responsive action is taken (248). If the updated metric does not exceed an applicable threshold (246), data associated with events other than the event just processed is deleted (250) and the process of FIG. 2B is repeated upon receipt of a next applicable event (240). Deleting old data and updating the metric based only on data associated with the current event and/or the most recent prior event limits the memory required to store data to be used to monitor/control access and also the processing resources required to determine upon occurrence of an event whether use has exceeded an applicable limit.

Figure 3:
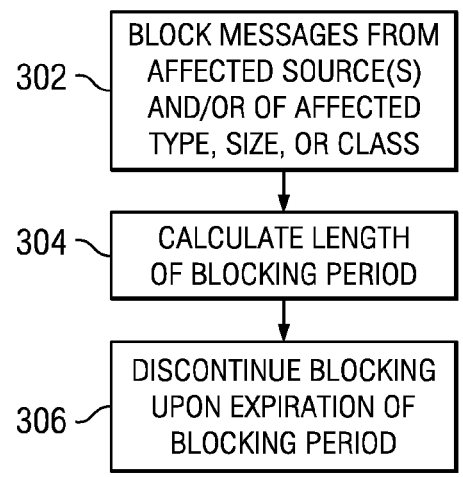
FIG. 3 illustrates a process used in some embodiments to block messages for a period in response to a threshold leaving for a metric being exceeded.

FIG. 3 illustrates a process used in some embodiments to block messages for a period in response to a threshold leaving for a metric being exceeded. In some embodiments, the process of FIG. 3 comprises at least part of the responsive action taken in step 210 of FIG. 2A. Depending on the configuration, messages from one or more affected sources, and/or messages of a particular type, size, class, etc. regardless of source, are blocked (302). In some embodiments, a firewall such as firewall 110 of FIG. 1B or firewall 126 of FIG. 1C is configured to block the messages by not forwarding them to the server(s) to which they are addressed. In some embodiments, a firewall is configured to reject connections from an offending source. The length of the blocking period is calculated (304). In some embodiments, messages are blocked for the period required for the value of the applicable metric to decay to a level such that a prescribed number of messages (e.g., one message) could be received without the metric being incremented to a level greater than the threshold. The length of the period is determined by calculating the time differential "dt" required for the value of the metric to decay to the prescribed level. Assuming each message has a weight of "1", the period "dt" can be determined by solving equation (2):

$$m_k b^{dt} = M - 1 \quad (2)$$

where M is the threshold and $m_k$ is the value of the metric upon receipt of the k-th message, i.e. the one that caused the value to exceed the threshold. Solving equation (2) yields the time period "dt" required before a message k+1 of weight "1" can be received without the threshold M being exceeded, i.e., $m_{k+1} \leq M$. Solving equation (2) for "dt" yields:

$$dt = \frac{\ln(M-1) - \ln m_k}{\ln b} \quad (3)$$

In some embodiments, a minimum blocking period of 15 seconds is implemented so that the overhead of blocking and unblocking does not become significant. While in the example shown above the blocking period is determined based on exponential decay, a similar approach may be used to determine a blocking period in implementations in which linear, combined linear and exponential, and/or other types of decay are used. In various embodiments, the blocking period is determined such that the metric is decayed to a level sufficiently below the threshold that a resumption of normal, expected, and/or permitted use would not result in the metric exceeding the threshold.

Figure 4:
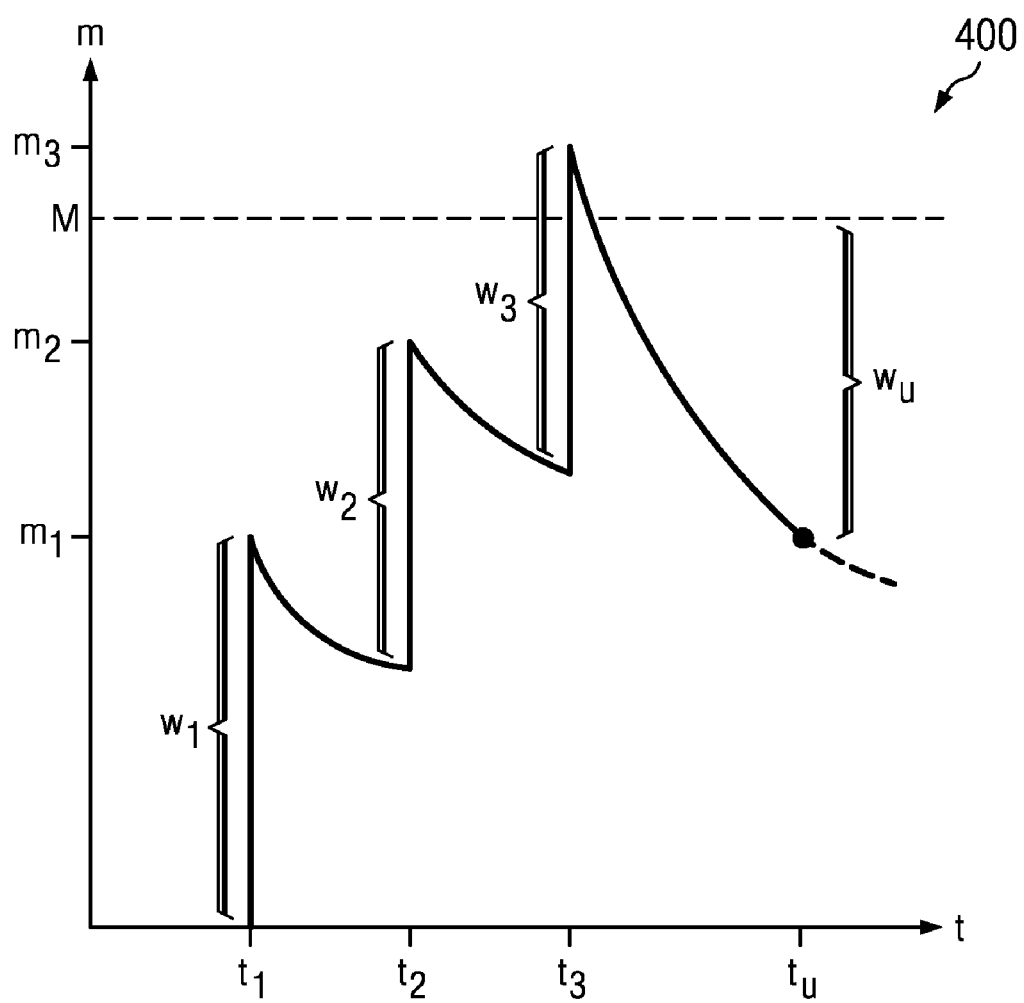
FIG. 4 shows a plot 400 of the value of the metric m over time in an embodiment in which different weights may be assigned to different messages or message types.

FIG. 4 shows a plot 400 of the value of the metric m over time in an embodiment in which different weights may be assigned to different messages or message types and in which exponential decay is used. In the example shown, a first message having weight $w_1$ and received at time $t_1$ resulted in the metric m having a value $m_1$. At time $t_2$, a second message having weight $w_2$ arrived. Equation (1) was applied to determine the decayed value of the metric m at time $t_2$ and the updated value $m_2$ that resulted once the weighted value $w_2$ was added. A third message arrived at time $t_3$ and resulted in the updated value of the metric, $m_3$, exceeding the threshold M. In the example shown, messages associated with the metric the value of which over time is shown in FIG. 4, such as those from an offending IP address associated with the metric, were blocked until time $t_u$, determined by applying a generalized form of equation (3):

$$dt = t_u - t_3 = \frac{\ln(M - w_u) - \ln m}{\ln b} \quad (4)$$

where $t_u$ is the "unblock" time and $w_u$ is the prescribed weight of the hypothetical message(s) the system should be able to receive once messages are no longer being blocked without the value of the metric exceeding the threshold.

In some embodiments, a separate metric m is maintained for each source of messages, e.g., one metric per source IP address in an embodiment in which the Internet protocol is used to send and receive messages. Using such an approach would, e.g., enable an offending IP address, such as one from which a denial of service attack is being launched, to be blocked while continuing to allow requests from other sources.

In some embodiments, a separate metric is maintained for each type of condition, e.g., each type of attack, the metric is being maintained to detect and/or avoid. For example, in one embodiment a separate metric is maintained for all messages, unauthorized messages, messages that generate an internal error (e.g., on a firewall such as firewall 126 of FIG. 1C), messages that generate a backend error (e.g., on one of the backend servers S1 to Sm of FIG. 1C); messages that require or are expected to require CPU usage above a prescribed threshold; and messages that result or are expected to result in backend latency (i.e., the time it takes to get a response back from a backend server such as servers S1 to Sm of FIG. 1C) above a prescribed threshold. For example, one may wish to configure a system to allow an overall message rate of 120 per minute without triggering any responsive action but to take responsive action, such as by blocking an offending source or generating an alert, if 3 unauthorized messages were received from the same source within a minute.

In some embodiments, as described above, different messages may be assigned different weights. For example, in an embodiment in which a separate metric is maintained for messages that exceed a prescribed threshold for CPU usage, the weight assigned to each message may be based at least in part on the actual or expected CPU usage. For example, if the threshold were 250 milliseconds (ms), messages that consume 250 ms of CPU usage might be assigned a weight of 1, those requiring 500 ms a weight of 2, those requiring 2.5 sec a weight of 10, etc.

In some embodiments, the metric-based approach described herein is applied to regulate the demand placed on one or more backend systems, as opposed to or in addition to ensuring that no source and/or type or class of message(s) exceeds the capacity available and/or allotted to it. Such an approach may be useful, e.g., to ensure that a legacy backend system used in connection with more modem protocols and/or systems will not be overloaded by the additional processing required by, for example, the larger messages and more extensive processing that may be required to operate with systems and/or protocols that are more advanced than those the legacy system was designed to handle. In one embodiment, a user interface is provided to enable a system administrator or other user to specify, with respect to each backend system to be protected, a maximum simultaneous "burst" of messages the system should receive (e.g., 10 messages); a maximum sustained message rate for the system (e.g., 20 messages per second); an expected/typical/threshold latency period associated with the system (e.g., 50 ms); and an expected/typical/threshold message size associated with the system (e.g., 2 kilobytes). In one embodiment, the expected/threshold latency and expected message size are used to determine the weight to be assigned to each message. For example, messages of which the latency and size are less than or equal to the corresponding threshold may be assigned a weight of 1, those that exceed either the threshold latency or the threshold size a weight of 2, and those that exceed both thresholds a weight of 3.

The values of the coefficient "b" in equation (1) and the maximum/threshold metric value "M" may be predetermined or preconfigured by a provider of a system configured to apply the metric-based approach described herein. Alternatively, a user interface may be provided to enable a user to specify a value either directly for the coefficient "b" and the threshold "M", or indirectly by specifying other parameters. In one embodiment, a user interface is provided to enable a user to specify a maximum sustained message rate (e.g., a maximum number of messages of weight 1 that can be received in a given period or unit time) and a maximum number of messages (e.g., of weight 1, or of cumulative weight W) that may be received instantaneously (or nearly so), i.e., in a single "burst". The maximum burst maps directly to the threshold M for the metric. This relationship is evident upon examination of the plot shown in FIG. 4 and considering the case in which the value of the metric m has been initialized or has decayed to a value of 0, such that messages resulting in a value of m=M can be received at any time t at which the value of m has decayed to (or been initialized at) a value of 0. The value of the coefficient "b" can be determined by considering the case in which the value of the metric m has been increased up to the threshold M, and determining the value of the coefficient b that would be required to ensure that the threshold M would not be exceeded if message were to be received at the user-indicated maximum rate "r" under such conditions. Applying equation (1), and assuming for simplicity that all messages have a weight of 1 (such that $w_k=1$; an average or typical or expected or threshold weight other than 1 could be used instead in an embodiment in which different messages may have different weights) and assuming that each successive message received at the maximum rate r restores the value of the metric m to the maximum permitted value M, yields:

$$M=Mb^{dt}+1 \qquad (5)$$

The time interval dt between messages is the inverse of the rate r when messages are received at the maximum rate. Substituting 1/r for dt in equation (5) yields:

$$M=Mb^{1/r}+1 \qquad (6)$$

which, solving for b, yields:

$$b = \left(1 - \frac{1}{M}\right)^r \qquad (7)$$

The metric-based approach described herein requires that only data associated with a current and most recent prior event be stored and/or processed to monitor and/or control access to a limited resource. Using the metric-based approach described herein as applied to a resource access via a network, it is not necessary to track extensive information about the messages that have been received within a sliding window to enable denial of service attacks and/or other conditions to be detected and/or prevented. Instead, in a basic implementation it is only necessary to track the current value of the metric and the time of receipt of the last most recently received message associated with the metric. By tracking and/or determining other basic data, further features such as assigning different weights to different messages based on relevant criteria, may be implemented.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   in response to a current event, accessing by one or more computer systems a metric indicating whether the current event has caused utilization of a resource to exceed a predetermined threshold or a later event related to the current event would cause utilization of the resource to exceed the predetermined threshold;
   decrementing by the one or more computer systems a value of the metric by a first amount, the first amount being a function of:

an elapsed time between the current event and a prior event to which the current event is successive, and a value of the metric computed in connection with the prior event;

incrementing by the one or more computer systems the value of the metric by a second amount based on an attribute of the current event; and initiating by the one or more computer systems one or more actions to address utilization of the resource if the value of the metric after being decremented and incremented exceeds the predetermined threshold;

wherein the first amount is exponentially related to the elapsed time when the metric exceeds the predetermined threshold and wherein the first amount is linearly related to the elapsed time when the metric falls below the predetermined threshold.

2. A method as recited in claim 1, wherein the one or more actions include sending an alert.

3. A method as recited in claim 1, wherein the one or more actions include blocking the current event.

4. A method as recited in claim 1, wherein the one or more actions include blocking a subsequent event.

5. A method as recited in claim 1, wherein the one or more actions include blocking subsequent events for a period of time.

6. A method as recited in claim 5, wherein the length of the period of time is selected such that the value of the metric is decayed to a level sufficiently below the threshold to ensure that resumption of a normal, expected, or permitted event activity will not cause the metric to exceed the threshold.

7. A method as recited in claim 1, wherein the one or more actions include directing or redirecting a request to a resource not associated with the metric the value of which has exceeded, or would exceed if the event were permitted, the threshold.

8. A method as recited in claim 1, wherein the metric and the threshold are selected to detect use of the resource at a level that deviates from a normal, expected, or permitted use of the resource.

9. A method as recited in claim 1, wherein the metric and the threshold are selected to detect use of the resource at a level that exceeds a capacity of the resource.

10. A method as recited in claim 1, wherein the metric comprises a first metric associated with a first resource, the threshold comprises a first threshold associated with the first resource, and the first resource comprises one of a plurality of resources, each having associated with it a resource-specific metric and a corresponding resource-specific threshold.

11. A method as recited in claim 1, wherein the current event and the prior event share an attribute and the metric and threshold are specific to events having the attribute.

12. A method as recited in claim 11, wherein the attribute includes one or more of the following: a source of the event; a destination or target of the event; and user, account, or other identity-related data comprising or associated with the event.

13. A method as recited in claim 1, wherein incrementing the value of the metric includes adding to the metric a weighted amount determined at least in part by an attribute of the current event.

14. A method as recited in claim 1, wherein the utilization of the resource comprises unauthorized access to or use of a bank or credit card account.

15. A method as recited in claim 1, wherein utilization of the resource comprises utilizing a server in a network to send a message, and wherein the current event comprises a message sent to a network-accessible resource.

16. An apparatus comprising:
one or more processors; and
one or more non-transitory computer-readable storage media encoding one or more instructions that when executed collectively by the processors:
in response to a current event, access a metric indicating whether the current event has caused utilization of a resource to exceed a predetermined threshold or a later event related to the current event would cause utilization of the resource to exceed the predetermined threshold;
decrement a value of the metric by a first amount, the first amount being a function of:
an elapsed time between the current event and a prior event to which the current event is successive, and
a value of the metric computed in connection with the prior event;
increment the value of the metric by a second amount based on an attribute of the current event; and
initiate one or more actions to address utilization of the resource if the value of the metric after being decremented and incremented exceeds the predetermined threshold;
wherein the first amount is exponentially related to the elapsed time when the metric exceeds the predetermined threshold and wherein the first amount is linearly related to the elapsed time when the metric falls below the predetermined threshold.

17. One or more computer-readable non-transitory storage media embodying software when executed operable to:
in response to a current event, access a metric indicating whether the current event has caused utilization of a resource to exceed a predetermined threshold or a later event related to the current event would cause utilization of the resource to exceed the predetermined threshold;
decrement a value of the metric by a first amount, the first amount being a function of:
an elapsed time between the current event and a prior event to which the current event is successive, and
a value of the metric computed in connection with the prior event;
increment the value of the metric by a second amount based on an attribute of the current event; and
initiate one or more actions to address utilization of the resource if the value of the metric after being decremented and incremented exceeds the predetermined threshold;
wherein the first amount is exponentially related to the elapsed time when the metric exceeds the predetermined threshold and wherein the first amount is linearly related to the elapsed time when the metric falls below the predetermined threshold.

* * * * *